Figure 1:
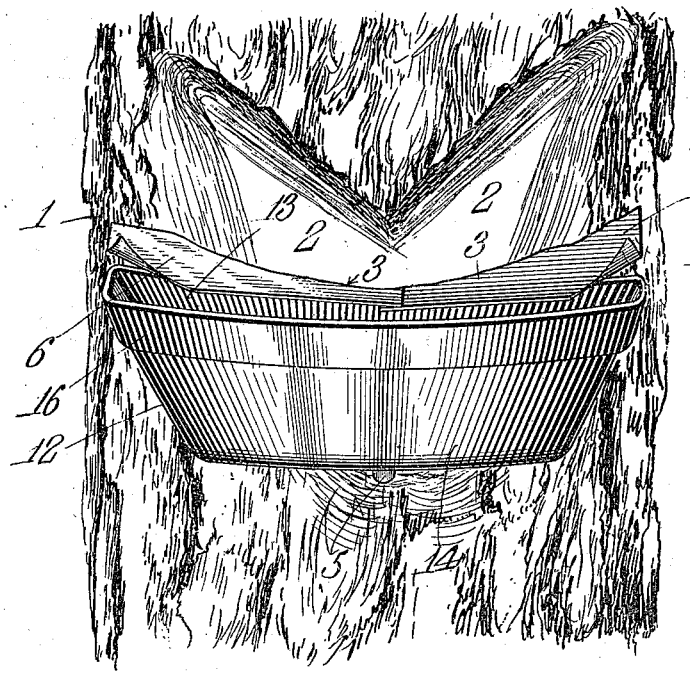

G. C. PRINGLE.
TURPENTINE CUP.
APPLICATION FILED APR. 10, 1909.

963,065.

Patented July 5, 1910.

2 SHEETS—SHEET 1.

George C. Pringle
Inventor

Witnesses
By C. A. Snow & Co.
Attorneys

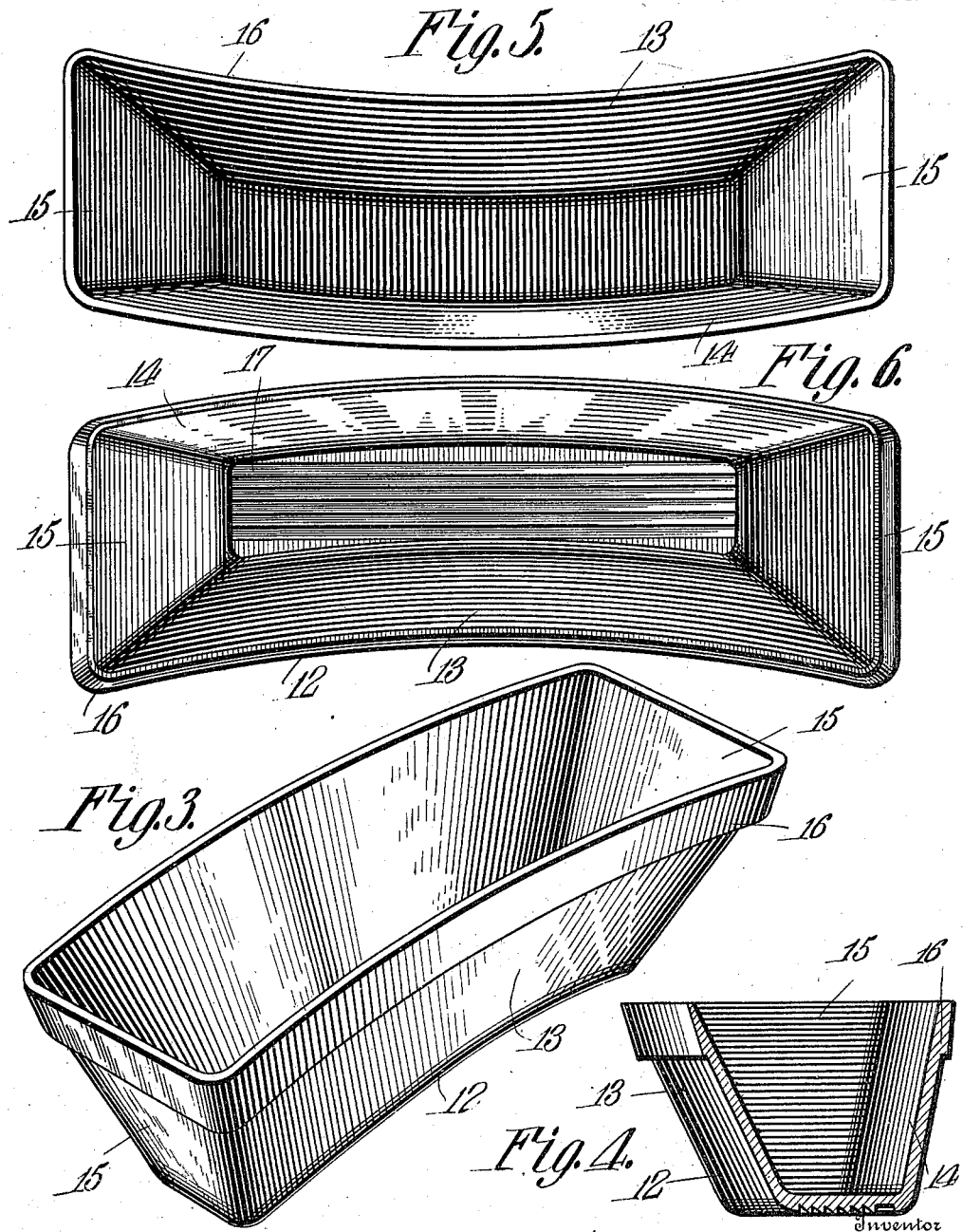

UNITED STATES PATENT OFFICE.

GEORGE C. PRINGLE, OF FLORALA, MISSISSIPPI.

TURPENTINE-CUP.

963,065.

Specification of Letters Patent. Patented July 5, 1910.

Application filed April 10, 1909. Serial No. 489,078.

*To all whom it may concern:*

Be it known that I, GEORGE C. PRINGLE, a citizen of the United States, residing at Florala, in the county of Jackson and State of Mississippi, have invented a new and useful Turpentine-Cup, of which the following is a specification.

This invention has reference to improvements in turpentine cups and its principal object is to provide a cup or receptacle for the crude turpentine as it flows from the tree which cup shall be of large capacity but of minimum vertical height and shall be readily attachable to and detachable from the tree and when on the tree shall be practically free from any liability of displacement especially by animals.

The common system of gathering turpentine is to cut into the base of the tree a comparatively wide and deep cavity ordinarily called a box and then the tree above the box is scarified to open up the resin ducts in the sap wood and the resin then exudes and flows down the scarified portion of the tree and ultimately finds its way into the box where it accumulates to be later dipped out and ultimately taken to the distillery for further treatment. This method of gathering the crude turpentine is not only wasteful but in many instances is destructive to the trees, many trees being killed either from disease attacking the tree through the deep wound caused by the formation of the box or the trees are easily blown over by storms because of the weakening of the tree trunk due to the deep cutting in the formation of the box. Furthermore, the box being always at a fixed point in a tree, subsequent flows of resin must pass over a greater expanse of wood before reaching the box since the point from which the fresh resin exudes becomes more and more removed from the box because of the higher scarification of the tree. The result of this is that each succeeding year there is a greater surface for the evaporation of the spirits of turpentine while more of the resin sticks to the tree and the quantity reaching the box is correspondingly lessened. Moreover atmospheric action on the resin so affects the wood that on the following year the resin flowing over such wood absorbs much coloring matter and there is therefore a deterioration of the quality of the resin due to both the action of light and air and the coloring matter and the resultant resins are dark colored which very materially affects the price. The box method of gathering turpentine also so affects the trees as to cause a reduction in their output while the timber value of the trees is greatly reduced from the destructive effects of fires and of rotting due to the accumulation of water in the boxes. By the present invention all these undesirable effects of the customary mode of gathering crude turpentine are entirely avoided while the initial operation may, because of the small height and great capacity of the cups constructed in accordance with the present invention, be started very low on the tree.

The cup constructed in accordance with the present invention has the side or face designed to be adjacent to the tree curved into general conformity with the tree, and if desired the opposite face of the cup may be curved likewise and be in parallel relation at the top to the first or tree side. The sides and ends of the cup, which latter may be materially longer than it is wide, all slope toward the bottom in the preferred form of the cup, although for reasons which will hereinafter appear, the important point is that the tree side of the cup should slope away from the tree, considering the upper edge or rim of the cup as substantially parallel with the tree. Furthermore, the bottom of the cup is specially shaped for engagement with fastening devices as will more fully hereinafter appear.

Figure 2:
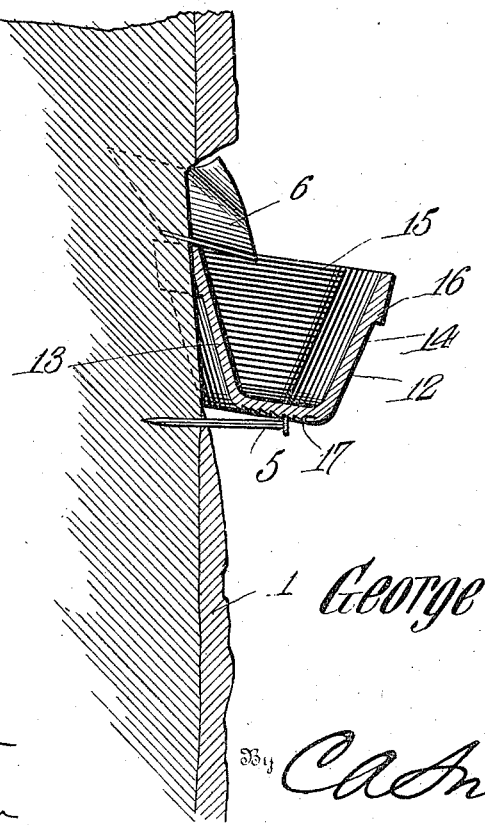

The invention will however be best understood from a consideration of the following detail description taken in connection with the accompanying drawings, forming a part of this specification, in which drawings, Figure 1 is an elevation of a portion of a tree showing the improved gathering means applied thereto. Fig. 2 is a vertical central section of the structure shown in Fig. 1, the tree being shown conventionally or schematically, and but one cup support being shown. Fig. 3 is a perspective view of the cup. Fig. 4 is a cross section thereof. Fig. 5 is a top plan view of the cup. Fig. 6 is a bottom plan view of the same.

Referring to the drawings there is illustrated a portion of a tree designated by the numeral 1. Assuming the tree to be a fresh tree, cuts are made through the bark and into the sap wood after the customary manner of cornering and below these cuts two substantially flat faces 2—2 are produced and at a short distance below the original cuts other cuts or kerfs 3—3 are produced slanting slightly upward as they enter the wood of the tree and directed slightly downward toward a common meeting point where the two cuts merge one into the other. Above the initial cuts the tree is scarified as in the ordinary process but this is not indicated in the drawings.

Below the kerfs 3 one or more nails 5 or like devices, are driven into the tree so that the nails project substantially horizontally. These nails may be ordinary wire nails of suitable size and while only one is shown it will be understood that two or more nails or the like, may be used.

The kerfs 3 are for the purpose of receiving an apron 6 consisting of two sheets preferably though not necessarily wider at one end than the other, and having one edge designed to be inserted in the kerf 3, there being provided an apron for each tree.

When the resin is flowing it will ultimately meet the apron 6 and be diverted by the latter away from the tree toward the outer edge of said apron.

The cup or receptacle used in connection with the present invention is designated by the reference numeral 12. This cup is shown as having two side walls 13—14 curved longitudinally and joined by end walls 15. The longitudinal curvature of the cup is designed to approach that of the circumferential curvature of a tree, but since for manufacturing reasons the cups should be all of the same curvature, the curvature of the cups will be only approximately that of the trees, but for practical purposes this is sufficient.

As will hereinafter appear it is the curvature of the wall 13, which wall, when the cup is in place, is adjacent to the tree, that is important. Therefore, while the showing of the cup is that the walls 13 and 14 so far as their upper and lower edges are concerned, are in parallel relation, it will be understood that the wall 14, may if so desired, be straight. It is preferred however that the walls 13 and 14 should approach each other toward the bottom of the cup and also that the walls 15 should approach each other toward the bottom of the cup. It is moreover important, for reasons which will hereinafter appear that the wall 13 should slant toward the wall 14 from the top of the cup toward the bottom thereof and this slant should be quite marked and is in excess of the slant of the wall 14 toward the bottom of the cup even when the said wall 14 is made slanting.

Extending entirely around the top of the cup on the outer surface thereof is a flat rib 16 which, particularly on the side of the cup designed to be adjacent to the tree, slants toward the bottom of the cup.

On the outer surface of the bottom of the cup there are formed a number of parallel ridges 17, these ridges being substantially straight and longitudinal to the cup even when the cup as a whole is curved. These ridges may be of any suitable shape in cross section but preferably are formed with slanting sides toward the cup side 13 and with abrupt shoulders toward the cup side 14. The purpose of these ridges is to engage the head of the nail 5 when the cup rests thereon.

When the cup is placed in position beneath the apron 6 the upper edge of the wall 13 engages under the apron and the bottom of the cup engages the head of the nail 5 by some one of the ridges 17. Because of the slant of the wall 13 away from the tree the cap 12 may be tipped slightly away from the tree and be locked firmly between the apron 6 and the nail or nails 5, the slight spring or give of the apron facilitating this adjustment. When the cup is slanted away from the tree then the curved upper edge of the wall 13 will be in close relation along substantially its whole length with the under surface of the apron, if the latter be slanted only slightly. It is because of the close relation of the upper edge of the wall 13 of the elongated cup 12 with the under surface of the apron 6 that the cup may be safely held by a single nail, as indicated, since the apron 6 will prevent any material rocking of the cup 12 on such single nail. Where the apron 6 does not approach the upper edge of the wall 13 sufficiently close then or at any time, two nails may be used.

The slanting wall 13 besides permitting a tipping of the cup 12 to make it fit tightly between the under surface of the apron 6 and the supporting nail or nails 5 also serves another important function. The bases of the trees curve outwardly toward the ground and with the cup shaped as shown in the drawings, it may be set substantially horizontal close the base of the tree and still leave sufficient clearance between the base of the tree and the walls 13 to permit the location of the cup very close to the ground. By elongating the cup in the direction of the circumference of the tree the cup may be made quite shallow and still be of sufficiently large capacity. This also permits the close approach of the cup to the ground.

The cup may be made of unglazed earthen ware and by having the front and rear walls parallel at the top and bottom and all the walls sloping toward the bottom, dipping of the accumulated resin from the cups is facilitated. The ridges 17 may be replaced by any other type of roughening of the bottom so as to engage the nail heads.

The apron may be made of galvanized iron or other metal which is weather-proof and inert to the resin or gum and even fibrous material such as glazed cardboard suitably weather-proofed may be used. Thin pressboard will be found useful for this purpose because of its resistance to weather conditions and the ease with which it may be cut and bent into the required shape. Furthermore pressboard is tough and strong.

What is claimed is:—

1. A means for gathering crude turpentine, comprising a cup having its bottom formed with a plurality of locking means progressing from the tree side of the cup toward the outer side thereof, a turpentine directing apron adapted to be inserted in and project from a tree, and upholding means for the cup coacting with the locking means on the bottom of the cup to hold the upper edge of the tree side of the cup firmly against the under face of the apron.

2. A means for collecting crude turpentine from trees comprising a laterally extending apron projecting from the tree when in operative position, a cup for receiving the crude turpentine from the apron, said cup being longer than wide and curved in the direction of its length with the tree side sloping toward the bottom of the cup and with the bottom of the cup having its under surface provided with locking means, and a support for the cup adapted to coact with the locking means on the bottom of the cup and uphold the latter with the edge on the tree side in locking engagement with the under side of the apron.

3. A collecting cup for gathering crude turpentine, said cup being longer than wide and provided on the bottom with a series of parallel ridges disposed lengthwise of the cup for engaging upholding means.

4. A collecting cup for gathering crude turpentine, said cup being longer than wide and provided on the under surface of the bottom with a series of parallel ridges longitudinal of the cup and each having one edge abrupt and the other edge slanting.

5. A collecting cup for gathering crude turpentine, said cup being longer than wide and curved in the direction of its length to partially embrace the tree, the under surface of the bottom of the cup being provided with longitudinally disposed straight ridges for upholding means.

6. A means for collecting crude turpentine comprising a laterally extending apron projecting from the tree in a downward direction, a laterally extended cup for receiving crude turpentine from the apron, and a support for the cup engaging the bottom of the latter and locking the upper edge of the cup against the under side of the apron, the bottom of the cup being provided with locking means co-acting with the support for preventing the bottom of the cup from moving away from the tree.

7. A means for collecting crude turpentine from trees comprising a laterally extended apron projecting from the tree and disposed substantially horizontal, an elongated cup for receiving the crude turpentine from the tree and having the upper edge of the tree side adapted to engage under the apron, the said cup having the under surface of the bottom provided with longitudinally disposed ridges, and a support for the cup engaging the ridges on the bottom thereof and co-acting therewith to lock the upper edge of the cup against the under side of the apron.

8. A means for collecting crude turpentine from trees comprising a laterally extended apron projecting from the tree, a cup for receiving the crude turpentine from the apron, said cup being longer than wide and curved in the direction of its length with the tree side sloping toward the bottom of the cup and with the bottom of the cup having its under surface formed with longitudinally disposed ridges, and a support for the cup adapted to engage the ridges in locking relation therewith and upholding the cup with the edge on the tree side in locking engagement with the under side of the apron.

9. A means for collecting crude turpentine from trees comprising a laterally extended apron projecting from the tree, a cup for receiving the crude turpentine from the apron, said cup being longer than wide and curved in the direction of its length with the upper portion of the tree side shaped to rest against the tree in substantially parallel relation therewith and below such upper portion sloping away from the tree toward the bottom of the cup, and the bottom of the cup being provided with a series of ridges disposed at successively greater distances from the tree side of the cup, and a support for the cup engaging the locking members on the bottom thereof and sustaining the cup with the upper edge of the tree side against the under side of the apron.

In testimony that I claim the foregoing as my own, I have hereto affixed my signature in the presence of two witnesses.

GEORGE C. PRINGLE.

Witnesses:
L. H. Dahy,
F. W. Elmer, Jr.